June 17, 1941.  L. GILMAN  2,246,092
BEARING
Filed July 26, 1940
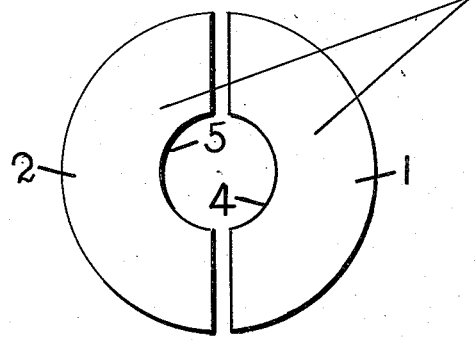
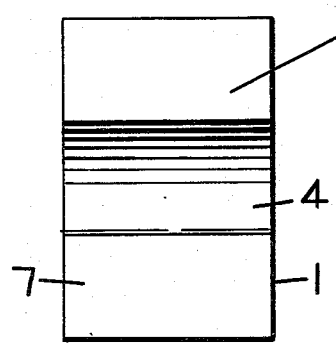
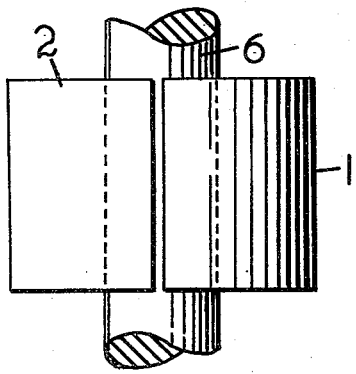
Inventor
LUCIUS GILMAN
By Harold A. Jewett
Attorney Patented June 17, 1941

2,246,092

UNITED STATES PATENT OFFICE 2,246,092

BEARING

Lucius Gilman, Arden, Del., assignor to E. I. du Pont de Nemours & Company, Wilmington, Del., a corporation of Delaware Application July 26, 1940, Serial No. 347,739

9 Claims. (Cl. 308—238)

This invention relates to mechanical bearings and more particularly to bearings obtained from synthetic materials.

The use of metal alloys for mechanical bearings of low friction is well known, but these bearings require frequent attention and lubrication. Metallic bearings containing incorporated lubricant improve this situation and are used to some extent for installations in which it is undesirable to depend upon periodic lubrication of the bearings while in use. These bearings are, however, heavy and rigid, and usually have indifferent frictional characteristics. Synthetic resin bearings, particularly from phenolic resins, have been investigated by industry and are used where high load bearing capacity, corrosion resistance, and lightness of weight are necessary. These bearings, however, also require attention and lubrication and there still remains a great need for a bearing possessing exceptionally good frictional properties and also having non-corrodability and lightness of weight. There also remains a need for a bearing which will need no lubricant at all for use where spoilage of the product from the lubricant is serious such as in food preparing or textile machinery. In addition, a non-lubricated bearing is urgently needed for home appliances where lubrication is uncertain.

This invention has as an object to provide bearings of low frictional resistance capable of use without lubricant. A further object is the production of new and improved bearings from non-metallic synthetic materials.

I have found that bearings formed from the high molecular weight ethylene polymers obtained by polymerizing ethylene at high pressures and temperatures have a unique combination of properties, namely, lubricantless operation, good frictional properties, non-corrodibility and lightness of weight, which make these bearings of unusual value for many purposes to which metallic bearings and previously used synthetic bearings are unsuited.

The solid ethylene polymers used in the practice of this invention are of the type described in Patents 2,153,553 and 2,188,465. These polymers correspond in composition substantially to $(CH_2)_x$ and show a crystalline structure when subjected to X-ray diffraction analysis. In general, the higher the melting point of the polymer selected, the greater will be the load bearing capacity of the bushing and the greater will be the permissible shaft speed for a given load. The hardness of these polymers does not usually exceed 40 (Rockwell determination, L scale), and they ordinarily melt from 85° C. to 210° C.

In the accompanying drawing

Fig. 1 is an end view of a bearing formed from the solid ethylene polymer,

Fig. 2 is a plan view of one of the bearing elements shown in Fig. 1, and

Fig. 3 is a plan view of the assembly of bearing and shaft.

The bearing members 1 and 2, which are molded or machined from the above described ethylene polymers have cooperating curved bearing surfaces 4 and 5 for receiving a rotatable shaft 6, sufficient material being removed from the flat faces 7 to obtain the desired fit of the shaft in the bearing.

My invention is further illustrated by the following specific examples.

Example I

Ethylene is polymerized as described in Example III of Patent 2,188,465, using an initial pressure of 3000 atmospheres. A pair of 180° arc bearings are machined from the resultant polymer and are employed to support a 5/8" diameter shaft rotating at 770 R. P. M., weighted to give a bearing load of 7 lbs./sq. in. of projected bearing area. When first started, heat is evolved at the bearing and some squeaking is heard. Within a few minutes, however, the surface of the polymer becomes accommodated to the shaft and there is no more squeaking. After 16 hours' operation no wear is visible and the shaft is still turning freely.

Example II

Bearings of polymerized ethylene having a molecular weight of about 20,000 are machined to the form shown in Fig. 1 and installed in the Almen machine for testing lubricants. When fabricated, material is removed from the flat faces adjacent to the curved bearing surfaces so that in the test the curved bearing surface will support the entire load produced by pressing the bearings together against a shaft. The Almen machine and its operation are fully described in an article by J. O. Almen in the Gas and Oil Journal, vol. 30, page 109 and in Patent 2,161,615. Using SAE-30 oil for lubricant, the machine is then operated at 600 R. P. M. with a two pound load on the beam (corresponding to a peripheral bearing speed of 39 ft./min. and a bearing load of 515 lbs./sq. in. of projected bearing area). The frictional resistance of the ethylene polymer bearing is found to be about half that of high tin Babbitt tested under the same conditions. A commercial fabric-filled phenolic resin bearing fails immediately in this test.

Example III

A pair of bearings prepared from polymerized ethylene having a molecular weight of at least 10,000 is installed to carry a ½" diameter shaft rotating at 110 R. P. M. and weighted to give a load of 0.4 lb./sq. in. of projected bearing area. If the fit of the bearing is too tight, heat will be evolved and polymer may be abraded away and out the ends of the housing during the first few hours of operation. Thereafter, the bearing temperature drops to a normal figure and practically no wear takes place during 40 days of almost continuous operation.

Molecular weights mentioned herein are determined as described in Patent 2,188,465. The ethylene polymers may be unoriented or molecularly oriented as by cold rolling or cold drawing. Bearings of greater load bearing capacity and greater resistance to mechanical shock are obtained by using oriented polymers rather than unoriented material.

The preferred polymers in the practice of this invention are those described in Patent 2,153,553. It is to be understood, however, that instead of the preferred polymer there may be used the various modified forms of the polymer such as the solid inter-polymerization products of ethylene and other polymerizable organic compounds having ethylenic unsaturation prepared as described in Patent 2,200,429, the halogenated ethylene polymers prepared as described in Patent 2,183,556, the halogenated and dehalogenated ethylene polymers prepared by heating the halogenated polymer with a dehalogenating agent such as ammonia, zinc, sodium, and the like as described in the copending application of E. W. Fawcett, Serial No. 194,983, filed March 9, 1938, and blends of the solid ethylene polymers with polymers of hydrocarbons and halogenated hydrocarbons described in the copending application of G. H. Latham, Serial No. 270,659, filed April 28, 1939.

For best results the polymers used in the practice of this invention are those softening above 90° C. and melting at not less than 100° C. and which have molecular weights above about 4,000 and preferably above 10,000.

Although the present bearings are particularly valuable because fillers, reinforcing agents and lubricants are not required, materials of this kind may be used in those instances in which such use may be desirable. For example, a solid lubricant such as graphite, powdered mica, or asbestos may be incorporated to reduce frictional forces. Liquid lubricants such as plasticizers for the polymers may be incorporated for the same purpose. Alpha-chloronaphthalene, o-dichlorobenzene, and high boiling liquid paraffins may be mentioned as among the materials suitable for use in this way. Fibers, fabrics, threads, and/or meshes may be incorporated in the polymers as reinforcing agents if desired although they are not usually necessary. In this case, the bearing should contain at least 10% polymerized ethylene. Metal in powder, wire, wire mesh, or other form may be incorporated to increase heat conductivity. Particularly valuable are metals which show good heat conducting or lubricating properties such as aluminum, lead, tin, copper, silver, zinc, etc. The bearings, when further decrease in frictional resistance is desired, may be operated either with the usual oil or graphite lubricants or with water or aqueous emulsions as the lubricant.

Although the examples have described the invention in connection with bushings and sleeve-type bearings, the solid ethylene polymers are also suitable for bearing plates, thrust bearings, cams, gears and all other types of bearing surfaces. The ethylene polymer bearing need not be stationary, since it may be attached to the moving shaft and may rest on a stationary housing so that friction takes place between the polymer surface and the housing rather than between the shaft and the stationary polymer. This construction facilitates the dissipation of heat. The bearings may be machined, compression molded, injection molded, die cast, or formed in a number of other ways. The polymer may be used as a thin coating on a backing of some other material such as metal or another polymeric product.

The present bearings have wide application but are especially useful where lubricantless operation is desired, where minimum weight is important, where clean, light-colored parts are desirable as in demonstration machinery, and where it is desirable to have the bearing abrade away readily to secure proper seating of the moving parts.

The machine applications in which the present invention is particularly valuable include textile machinery, food handling machinery, and household motors such as found in electric vacuum cleaners, refrigerators, and other mechanisms which are subject to infrequent or no lubrication. The present bearings are also especially advantageous in connection with mechanisms, such as pulleys, and the like, which are subjected to outdoor exposure, and are therefore liable to corrosion when made of metal. These bearings are also useful where it is desirable to provide electrical insulation between a stationary and a moving part.

The ethylene polymers used in the practice of this invention are so soft that they will not scratch or score a shaft under any conditions. Since even the softest metal alloys normally contain certain hard, crystalline components, ethylene polymer bearings are useful wherever it is exceptionally desirable to avoid scoring any part moving in contact with the bearings.

As many apparently widely different embodiments of this invention may be made without departing from the spirit and scope thereof, it is to be understood that I do not limit myself to the specific embodiments thereof except as defined in the appended claims.

I claim:

1. A machine bearing comprising a solid polymer having a continuous carbon to carbon chain and which softens at temperatures above 90° C.

2. A machine bearing comprising a solid ethylene polymer corresponding in composition substantially to $(CH_2)_x$ and showing by X-ray diffraction analysis a crystalline structure.

3. A machine bearing, the load carrying surface of which is the ethylene polymer defined in claim 1.

4. The bearing set forth in claim 1 in which said polymer exhibits molecular orientation.

5. A bearing provided with a load carrying surface adapted to receive a rotating shaft, said load carrying surface comprising the ethylene polymer defined in claim 2.

6. The machine bearing as defined in claim 1 in which said polymer comprises the solid interpolymerization product of ethylene and another polymerizable organic compound having ethylenic unsaturation.

7. The machine bearing as defined in claim 1 in which said polymer comprises a halogenated ethylene polymer.

8. The machine bearing as defined in claim 1 in which said polymer comprises the dehalogenation product of a halogenated polymer of ethylene.

9. A machine bearing comprising a fabric reinforced ethylene polymer, said polymer corresponding in composition substantially to $(CH_2)_x$ and showing by X-ray diffraction analysis a crystalline structure.

LUCIUS GILMAN.